Patented Nov. 15, 1927.

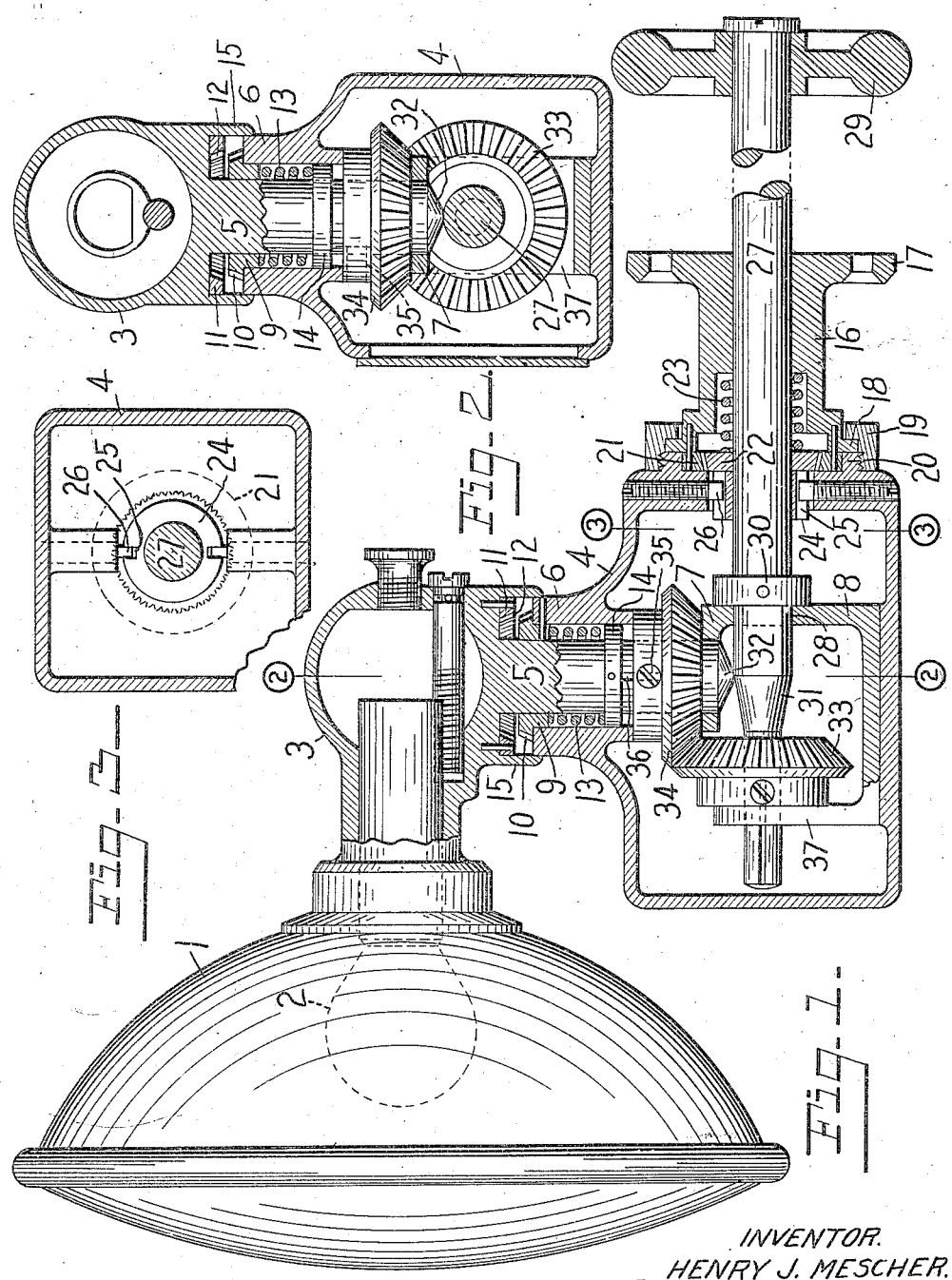

1,649,175

UNITED STATES PATENT OFFICE.

HENRY J. MESCHER, OF DAYTON, OHIO.

SUPPORT FOR SPOTLIGHTS.

Application filed September 1, 1922. Serial No. 585,665.

This invention relates to adjustable supports for spot lights and the like, such as are commonly used on automobiles.

One object of the invention is to provide such a support which will enable the spot light to be adjusted about either of two axes and will positively retain the spot light in its adjusted positions.

A further object of the invention is to provide such a device which will be simple in its construction and positive in its operation.

Other objects of the invention will appear as the device is described in detail.

In the accompanying drawings Fig. 1 is a longitudinal sectional view taken centrally through a supporting structure embodying my invention and showing the spot light in elevation; Fig. 2 is a sectional view taken on the line 2—2 of Fig. 1; and Fig. 3 is a sectional view taken on the line 3—3 of Fig. 1.

In these drawings I have illustrated one embodiment of my invention and have shown the spot light as rotatably mounted on a frame which in turn is mounted for rotation about an axis extending transversely to the axis about which the spot light rotates on the frame. Separate locks are provided for securing the spot light and the frame respectively against rotation. A shaft having both rotary and axial movement is mounted in the frame and is provided with means whereby the axial movement thereof will control the positions of both locks and the rotatory movement thereof will rotate either the frame or the spot light, depending upon which one is locked against movement. It will be understood that the particular embodiment here shown has been chosen for the purposes of illustration only and that the device may take various forms without departing from the spirit of the invention.

In that form of the device here illustrated I have shown the spot light as comprising a reflector 1 having mounted therein an electric lamp 2. The reflector is carried by a bracket 3 which may be rotatably mounted on a frame 4 in any suitable manner. In the present construction the bracket 3 is provided with a stud 5 preferably formed integral therewith and rotatably mounted in bearings 6 and 7 on the frame. Preferably the frame is in the form of a housing and, as here shown, the bearing 6 is formed in a boss carried by one side of the housing and the bearing 7 is formed in a bracket 8 mounted within the housing and forming a part of the frame. Locking devices are interposed between and secured respectively to the bracket and the frame, one of the locking devices, or members, being movable into and out of locking engagement with the other. Preferably, the stationary locking member is in the form of a collar 9 mounted about the stud 5 and rigidly secured to the bearing 6 of the frame. This collar is provided with peripheral teeth 10 which are preferably inclined to the axis of the stud 5, after the manner of a beveled gear. The movable locking member is shown at 11 as rigidly secured to the bracket 3 and the bracket and stud are capable of a limited axial movement to permit the locking member 11 to be moved into and out of locking engagement with the locking member 9.

The locking member 11 is annular in form and is provided with internal teeth 12 arranged to mesh with the teeth 10 of the locking member 9, and thus lock the bracket rigidly against rotary movement relatively to the frame. A spring 13 coiled about the stud 5 within the bearing 6 and confined between the locking member 9 and a collar 14 secured to the stud, tends to move the bracket 3 and locking member 11 inwardly so as to move the locking member 11 into engagement with the locking member 9 and retain the same in such engagement. If desired, the bracket may be provided with an annular flange 15 of sufficient length to overlap the bearing or boss 6 and thus completely inclose the locking members, thereby protecting the same against the entrance of dust or other foreign matter.

The frame, or housing, 4 is rotatably mounted upon a normally stationary supporting structure which, in the present instance, is shown as a bearing 16 having a flange 17 by means of which it may be secured to the body of the automobile or other structure on which the light is to be mounted. This supporting structure has, at that end adjacent to the frame 4, an annular flange 18 adapted to be embraced by a coupling member 19 which is screw threaded onto a boss 20 carried by the end of the frame 4, thus detachably connecting the frame with the supporting structure and holding the same against axial movement relatively thereto while permitting it to rotate about the axis of the bearing, or supporting structure, 16. Locking devices are interposed between the supporting structure 16 and the frame and in the present instance these locking devices are similar to those interposed between the bracket and the frame. The annular toothed locking member, shown at 21, is in this instance, the stationary member and is rigidly secured to the supporting structure 16 within the boss 20 of the frame. The inner locking member 22 is provided with teeth adapted to be moved into and out of mesh with the teeth of the locking member 21 and is acted upon by a spring 23 which tends to move the same into locking engagement with the locking member 21 and to normally retain the same in that position. The locking member 22 is so connected with the frame 4 that it is held against rotatory movement relatively thereto but is capable of axial movement relatively to the frame sufficient to enable it to be moved into and out of locking engagement with the locking member 21. As here shown, a hub, or collar, 24 is rigidly secured to the locking member 22 and is mounted within an opening in the end of the frame 4 and provided with slots 25 extending lengthwise thereof and adapted to receive the inner ends of the pins 26 which, in the present instance, are screw threaded into the end portion of the frame 4. It will be apparent, therefore, that when the locking devices for the bracket and for the frame are unrestrained they will occupy their locking positions and both parts will be rigidly locked against rotation.

A shaft 27 is mounted in the bearing 16 and in a bearing 28 in the bracket 8 within the frame 4 and is capable of both rotatory and axial movement. The rear end of the shaft 27 extends beyond the bearing 16 so that it may project into the automobile where it is provided with a suitable operating device, such as a hand wheel 29 by means of which either rotatory or axial movement may be imparted thereto. The axial movement of the shaft controls the locking devices and to this end I have shown the shaft as having secured thereto, between the bracket 8 within the housing and a hub 24 of the locking member 22, which is loosely mounted on the shaft, a collar 30 which will engage the hub of the locking member 22 when rearward movement is imparted to the shaft and move the locking member rearwardly against the action of the spring 23, thereby releasing the frame from the bearing and permitting it to be rotated by the shaft, as will hereinafter appear. That portion of the shaft within the frame 4 and adjacent to the end of the stud 5, is provided with a tapered portion 31 which contacts with the end of the stud 5, this end of the stud being preferably tapered, as shown at 32 to provide an inclined surface which will contact with the tapered portion of the shaft. The tapered parts of the stud and of the shaft are so arranged that when the shaft is moved to its foremost position, as shown in Fig. 1, the tapered portion thereof will force the stud outwardly, thus moving the locking member 11 out of engagement with the locking member 9 and permitting the bracket and the spot light which is carried thereby to be rotated. When the shaft is moved rearwardly the spring 13 will return the locking member 11 to its normal, or locking position.

The rotatory movement of the shaft 27 will rotate either the frame 4 or the bracket 3, if either of these members is unlocked. To this end I have mounted on the shaft 27 a beveled gear 33 which is splined to the shaft so that the latter may have sliding movement in the gear, but will not have rotatory movement relatively thereto. The gear 33 is in constant mesh with a second gear 34 mounted on the stud 5. The gear 34 is secured to the stud 5 by means of a pin, or screw, 35 mounted therein and extending into a slot 36 in the stud so that the stud may have axial movement relatively to the gear 34 but will rotate with that gear. The gear 33 is held against axial movement by an arm 37 of the bracket 8 in which the end of the shaft 27 is mounted and by its contact with the gear 34. The gear 34 is held against axial movement in one direction by its contact with the gear 33 and in the other direction by its contact with the inner end of the bearing 6.

When the several parts of the device are in their normal positions the collar 30 of the shaft 27 will lie adjacent to the inner end of the hub 24 of the locking member 22 and both the locking member 22 and the locking member 11 will be in their operative positions. If it is desired to adjust the bracket 3 on the frame 4 the shaft is forced forwardly, thus imparting axial movement to the stud 5 and disengaging the locking members 11 and 9. The rotatory movement of the shaft 27 will then be transmitted through the gears 33 and 34 to the stud 5 and the bracket 3 and the spot light carried thereby will be rotated on the frame. When the desired position has been secured the shaft is moved rearwardly and the locking device automatically resumes its operative position, thus locking the spot light against further movement. If it is desired to adjust the frame 4 relatively to the supporting structure 16 the shaft 27 is moved rearwardly from its normal position, thus causing the collar 30 to engage the hub 24 and move the locking member 22 into an inoperative position, thereby releasing the frame 4 and permitting the same to be rotated by the shaft 27. The gears 33 and 34 being permanently in mesh and the gear 34 and stud 5 being locked against rotation it will be apparent that the shaft 27 can not rotate relatively to the frame 4 and, therefore, the frame must rotate with the shaft. The locking member 22 having been moved out of engagement with the locking member 21 is free to rotate with the housing. When the desired adjustment has been secured the shaft is returned to its normal position and the locking member 22 automatically restored by the spring 23 to its operative position, thus locking the frame 4 against rotation.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a device of the character described, a supporting structure, a frame rotatably mounted on said structure, a device to lock said frame against rotation with relation to said supporting structure, a stud rotatably and slidably mounted in said frame and extending transversely to the axis thereof, a spot light carried by said stud, cooperating locking members connected respectively with said frame and said stud and arranged to be moved into and out of locking engagement by the sliding movement of said stud, a shaft rotatably and slidably mounted in said supporting structure and said frame, means controlled by the sliding movement of said shaft to impart axial movement to said stud and to actuate the locking device for said frame, and means controlled by the rotary movement of said shaft to rotate said frame or said spot light about its axis.

2. In a device of the character described, a supporting structure, a frame rotatably mounted on said structure, a device to lock said frame against rotation with relation to said supporting structure, a stud rotatably and slidably mounted in said frame and extending transversely to the axis thereof, a spot light carried by said stud, cooperating locking members connected respectively with said frame and said stud and arranged to be moved into and out of locking engagement by the sliding movement of said stud, a shaft rotatably and slidably mounted in said supporting structure and said frame, a gear slidably mounted on said stud and held against rotation with relation thereto, a second gear slidably mounted on said shaft, held against rotation with relation thereto and in permanent mesh with the first mentioned gear, said shaft having a part arranged to impart axial movement to said stud when said shaft is moved longitudinally in one direction, and means actuated by the longitudinal movement of said shaft in the other direction to move the locking device for said frame into an inoperative position.

3. In a device of the character described, a supporting structure having a bearing, a frame rotatably mounted on said supporting structure and having a bearing arranged in axial alinement with the bearing in said supporting structure, a locking member carried by said supporting structure, a second locking member mounted for sliding movement with relation to said frame but held against rotation with relation thereto, a spring to hold said second locking member normally in engagement with the first mentioned locking member, a shaft rotatably and slidably mounted in the bearings in said supporting structure and said frame, a stud rotatably and slidably mounted in said frame and extending transversely to said shaft, a locking member carried by said frame, a second locking member connected with said stud, a spring acting on said stud to hold said second locking member normally in engagement with said first mentioned locking member, intermeshing gears slidably and nonrotatably mounted on said stud and said shaft respectively, said shaft and said stud having cooperating parts to cause said stud to move axially against the action of said spring when said shaft is moved axially in one direction, and a part carried by said shaft and arranged to move the second locking member for said frame into an inoperative position when axial movement is imparted to said shaft in the opposite direction.

4. In a device of the character described, a supporting structure, a frame rotatably mounted on said structure, a bracket having a stud rotatably and slidably mounted in said frame, a device controlled by the sliding movement of said stud to lock said bracket against rotation on said frame, a shaft rotatably and slidably mounted on said supporting structure and having means whereby the sliding movement of said shaft will impart sliding movement to said stud, and a geared connection between said shaft and said stud.

5. In a device of the character described, a supporting structure, a frame rotatably mounted on said structure, a locking member secured to said supporting structure, a second locking member mounted for movement into and out of engagement with the first mentioned locking member and held against rotation relatively to said frame, a bracket mounted on said frame for both rotatory and axial movement relatively thereto, locking members secured respectively to said bracket and said frame, one of said locking members being movable into and out of engagement with the other locking member, a shaft mounted on said supporting structure for both rotatory and axial movement, means actuated by the axial movement of said shaft to impart movement to said movable locking members, and means actuated by the rotatory movement of said shaft to impart rotatory movement to either said bracket or said frame.

6. In a device of the character described, a supporting structure, a frame rotatably mounted on said structure, locking members connected with and held against rotation relatively to said supporting structure and said frame respectively, one of said locking members being movable into and out of locking engagement with the other member, a spring tending to move said last mentioned locking member into its locking position, a bracket rotatably mounted on said frame, locking members connected with and held against rotation relatively to said bracket and said frame respectively, one of said last mentioned locking members being movable into and out of locking engagement with the other, a spring acting on said movable locking member to move it into its locking position, a shaft mounted on said supporting structure for both rotatory and axial movement, means actuated by the axial movement of said shaft to move either of said movable locking members into its inoperative position, and means actuated by the rotatory movement of said shaft to impart rotatory movement to either said bracket or said frame.

7. In a device of the character described, a supporting structure, a frame rotatably mounted on said structure, locking members connected with and held against rotation relatively to said supporting structure and said frame respectively, one of said locking members being movable into and out of locking engagement with the other member, a spring tending to move said last mentioned locking member into its locking position, a bracket rotatably mounted on said frame, locking members connected with and held against rotation relatively to said bracket and said frame respectively, one of said last mentioned locking members being movable into and out of locking engagement with the other, a spring acting on said movable locking member to move it into its locking position, a shaft mounted on said supporting structure for both rotatory and axial movement, means actuated by the axial movement of said shaft in one direction from a neutral position to move the first mentioned movable locking member into its operative position, means actuated by the axial movement of said shaft in the other direction from said neutral position to move the last mentioned movable locking member into its inoperative position, and means actuated by the rotatory movement of said shaft to rotate said frame when the first mentioned movable locking member is in its inoperative position and to rotate said bracket relatively to said frame when the last mentioned movable locking member is in its inoperative position.

8. In a device of the character described, a supporting structure, a frame rotatably mounted on said structure, locking members connected with and held against rotation relatively to said supporting structure and said frame respectively, one of said locking members being movable into and out of locking engagement with the other member, a spring tending to move said last mentioned locking member into its locking position, a bracket mounted on said frame for both rotatory and axial movement relatively thereto, a locking member secured to said frame, a second locking member secured to said bracket and adapted to be moved into and out of operative engagement with the locking member of said frame by the axial movement of said bracket, a shaft mounted on said supporting structure for both rotatory and axial movement, means actuated by the axial movement of said shaft in one direction to move the first mentioned movable locking member into an inoperative position, and means actuated by the axial movement of said shaft in the opposite direction to impart axial movement to said bracket, and means operated by the rotatory movement of said shaft to impart rotatory movement to either said frame or said bracket.

9. In a device of the character described, a supporting structure, a frame rotatably mounted on said structure, a locking member secured to said supporting structure, a second locking member mounted for movement into and out of engagement with the first mentioned locking member and held against rotation relatively to said frame, a spring to hold said second locking member in its operative position, a bracket mounted on said frame for both rotatory and axial movement relatively thereto, cooperating locking members rigidly secured to said frame and said bracket respectively whereby one of said locking members will be moved into and out of its operative position by the axial movement of said bracket, a spring to hold the last mentioned locking member normally in its locking position, a stud connected with said bracket for movement therewith, a shaft rotatably and slidably mounted in said supporting structure, a collar carried by said shaft and arranged to actuate the first mentioned movable locking member when the shaft is moved axially in one direction, said shaft having an inclined surface to impart axial movement to the stud of said bracket when said shaft is moved axially in the opposite direction, and beveled gears connecting said stud and said shaft, whereby the rotatory movement of said shaft will rotate either said frame or said bracket.

In testimony whereof, I affix my signature hereto.

HENRY J. MESCHER.